US009170844B2

(12) United States Patent
Blainey et al.

(10) Patent No.: US 9,170,844 B2
(45) Date of Patent: Oct. 27, 2015

(54) PRIORITIZATION FOR CONFLICT ARBITRATION IN TRANSACTIONAL MEMORY MANAGEMENT

(75) Inventors: Robert J. Blainey, Newmarket (CA); C. Brian Hall, Calgary (CA); Thomas J. Heller, Jr., Rhinebeck, NY (US); Mark F. Wilding, Barrie (CA)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 12/348,216

(22) Filed: Jan. 2, 2009

(65) Prior Publication Data

US 2010/0174840 A1   Jul. 8, 2010

(51) Int. Cl.
| | |
|---|---|
| *G06F 9/50* | (2006.01) |
| *G06F 9/52* | (2006.01) |
| *G06F 9/46* | (2006.01) |
| *G06F 13/16* | (2006.01) |

(52) U.S. Cl.
CPC .............. *G06F 9/5016* (2013.01); *G06F 9/467* (2013.01); *G06F 9/526* (2013.01); *G06F 13/1605* (2013.01)

(58) Field of Classification Search
CPC ......... G06F 12/00; G06F 13/00; G06F 13/14; G06F 13/16; G06F 13/1605; G06F 13/1626; G06F 13/1642; G06F 13/1652; G06F 13/1663; G06F 9/466; G06F 9/467; G06F 17/30227; G06F 9/5016; G06F 9/526
USPC .................. 710/240–241; 707/821–822, 826; 709/201; 711/151
See application file for complete search history.

(56) References Cited

U.S. PATENT DOCUMENTS

| | | | |
|---|---|---|---|
| 4,928,234 A | 5/1990 | Kitamura et al. | |
| 6,195,724 B1 | 2/2001 | Stracovsky et al. | |

(Continued)

FOREIGN PATENT DOCUMENTS

| | | |
|---|---|---|
| EP | 1852783 | 11/2007 |
| JP | 2003186856 | 7/2003 |
| JP | 2007-094649 A | 4/2007 |

OTHER PUBLICATIONS

"Written Opinion of the International Searching Authority". PCT/EP2009/067496.*

(Continued)

*Primary Examiner* — Thomas J Cleary
(74) *Attorney, Agent, or Firm* — Steven M. Greenberg, Esq.; CRGO Law

(57) ABSTRACT

Embodiments of the present invention provide a method, system and computer program product for software prioritization of concurrent transactions for embedded conflict arbitration in transactional memory management. In an embodiment of the invention, a method for software prioritization of concurrent transactions for embedded conflict arbitration in transactional memory management can include setting different hardware registers with different priority values for correspondingly different transactions in a transactional memory system configured for transactional memory management according to respective priority values specified by priority assignment logic in external software support for the system. The method also can include detecting a conflict amongst the transactions in the system. Finally, the method can include applying conflict arbitration within the system based upon the priority values specified by the priority assignment logic in the external software support for the system.

14 Claims, 2 Drawing Sheets

(56) References Cited

U.S. PATENT DOCUMENTS

| | | | |
|---|---|---|---|
| 6,751,711 | B1 | 6/2004 | De Buda |
| 7,720,891 | B2 * | 5/2010 | Luchangco et al. ........... 707/826 |
| 2003/0070049 | A1 | 4/2003 | Suzuki |
| 2006/0102967 | A1 * | 5/2006 | Kamigaki et al. ............ 257/390 |
| 2007/0198785 | A1 * | 8/2007 | Kogge et al. .................. 711/154 |
| 2008/0120484 | A1 | 5/2008 | Zhang et al. |
| 2009/0187628 | A1 * | 7/2009 | DeSota et al. ................ 709/205 |

OTHER PUBLICATIONS

McDonald, Austen, et al; Architectural Semantics for Practical Transactional Memory; Proceedings of the 33rd Int'l Symposium on Computer Architecture; tcc.standford.edu/publications/tcc_isca2006.

Herlihy, Maurice, et al; Transactional Memory: Architectural Support for Lock-Free Data Structures; Proceedings of the 20th Annual Inter'l Symposium on Computer Architecture; ftp.cs.umass.edu/pub/osl/papers/isca93.

McDonald, Austen, et al; Transactional Memory: The Hardware-Software Interface; IEEE, 2007.

Helal, Abdelsalam, et al; Adaptive Transaction Scheduling; ACM, 1993.

Chung, JaeWoong, et al; Tradeoffs in Transactional Memory Virtualization; ASPLOS '06; CM 2006.

Yen, Luke, et al; LogTM-SE:Decoupling Hardware Transactional Memory from Caches; 13th Annual Int'l Symposium on High Performance Computer Architecture (HPCA-13); 2007.

Agrawal, Kunal, et al; Memory Models for Open-Nested Transactions; MSPC'06; ACM 2006.

Moss, J. Eliot B., et al; Nested Transactional Memory: Model and Architecture Sketches; Science Direct; 2006.

Moravan, Michelle J., et al; Supporting Nested Transactional Memory in LogTM; ASPLOS'06; ACM 2006.

\* cited by examiner

PRIORITIZATION FOR CONFLICT ARBITRATION IN TRANSACTIONAL MEMORY MANAGEMENT

REFERENCE TO CO-PENDING APPLICATIONS FOR PATENT

The present application is related to the following co-assigned U.S. Patent Applications, which are expressly incorporated by reference herein:

U.S. application Ser. No. 12/348,208, entitled "DYNAMIC NEST LEVEL DETERMINATION FOR NESTED TRANSACTIONAL MEMORY ROLLBACK", filed on Jan. 2, 2009.

BACKGROUND OF THE INVENTION

1. Field of the Invention

The present invention relates to the field of transactional memory utilization in parallel computing and more particularly to conflict arbitration in transactional memory management.

2. Description of the Related Art

Transactional memory techniques attempt to simplify parallel programming by allowing a group of load and store instructions to execute in an atomic way. Generally speaking, transactional memory is a concurrency control mechanism analogous to database transactions for controlling access to shared memory in concurrent computing. However, unlike the locking techniques used in most modern multithreaded applications, transactional memory can be viewed as optimistic in that a thread completes modifications to shared memory without regard for the activities of other threads, while recording every performed read and write and buffering the speculative changes to memory.

Transactions conflict when two or more transactions access the same block of memory, and at least one of those accesses is a write access. When utilizing transactional memory, instead of placing the onus on the reader or writer of a block of memory to ensure that the execution of a transaction does not conflict with other transactions in progress, the onus is placed on the transactional memory system to verify that other threads have not concurrently made conflicting references to the block of memory. Such a transactional memory system can be realized in software, hardware, or a combination of the two. The operation in which memory references are checked against other concurrent memory references is often referred to as validation. If validation is successful, at the conclusion of a transaction all memory changes are made permanent in an operation often referred to as a commit. Yet, a transaction can abort at any time, causing all of prior changes performed by the transaction to be rolled back or undone. If a transaction cannot be committed due to conflicting changes, the transaction can be aborted and re-executed from the beginning until the transaction succeeds.

It will be recognized by the skilled artisan, then, that the benefit of the optimistic approach of transactional memory is increased concurrency. Specifically, in the optimistic approach known in the art, no thread of execution need to wait to access a block of memory. Further, different threads of execution can safely and simultaneously modify disjoint parts of a data structure that would otherwise be protected under the same lock. Overall, despite the overhead incurred in retrying failed transactions, in many realistic programs conflicts arise rarely enough that transactional memory techniques may provide an immense performance gain over lock-based protocols on large numbers of processors.

Conflict arbitration is the mechanism for deciding which transactions will be blocked or aborted when a conflict occurs, and which transactions will be allowed to continue execution. Conflict arbitration is controlled by an underlying contention management policy. Simple conflict arbitration mechanisms have been proposed for transactional memory systems, such as aborting a transaction when the transaction attempts to access data conflicting with an access of the same data by another active transaction. More recent research, however, has indicated the importance of better contention management. Better contention management avoids "livelock" that becomes possible in simple contention management policies, and better contention management can substantially improve performance in the case of frequent conflicts. A sophisticated contention management policy can combine the temporary blocking of a transaction attempting a conflicting access while awaiting a successful commit by a competing transaction, with heuristics to maximize transaction throughput, and also with mechanisms to improve fairness or provide better guarantees of forward progress. Even still, while some contention management policies demonstrate good performance across a set of benchmarks or applications, no single policy has been found that is universally optimal.

BRIEF SUMMARY OF THE INVENTION

Embodiments of the present invention address deficiencies of the art in respect to conflict arbitration for transactional memory systems and provide a novel and non-obvious method, system and computer program product for software prioritization of concurrent transactions for embedded conflict arbitration in transactional memory management. In an embodiment of the invention, a method for software prioritization of concurrent transactions for embedded conflict arbitration in transactional memory management can include setting different hardware registers with different priority values for correspondingly different transactions in a system configured for transactional memory management according to respective priority values specified by priority assignment logic in external software support for the system.

The method also can include detecting a conflict amongst the transactions in the system. Finally, the method can include applying conflict arbitration within the system based upon the priority values specified by the priority assignment logic in the external software support for the system. Priorities values form the basis of the conflict arbitration mechanism and implement a contention management policy. Having software control the priority values allows for the use of different contention management policies as appropriate for each benchmark or application.

In one aspect of the embodiment, the method also can include retrieving a conflict arbitration control value from another register in the system. The conflict arbitration control value can specify at least one of a type and a nature of a conflict arbitration action. As such, the application of the conflict arbitration can be limited to at least one of a type and a nature of a conflict arbitration action specified by the conflict arbitration control value. In another aspect of the embodiment, the different priority values can be limited to a range of priority values able to be specified by the priority assignment logic in the external software support for the system.

In yet another aspect of the embodiment, applying conflict arbitration within the system based upon the priority values specified by the priority assignment logic in the external software support for the system can include blocking a selected one of the transactions having a lower priority than others of the transactions. Alternatively, applying conflict arbitration within the system based upon the priority values specified by the priority assignment logic in the external software support for the system can include aborting a selected one of the transactions having a lower priority than others of the transactions. As another alternative, applying conflict arbitration within the system based upon the priority values specified by the priority assignment logic in the external software support for the system can include detecting at least two of the transactions with equal priorities and generating an interrupt to the external software support to perform conflict arbitration for the at least two of the transactions in lieu of the system performing the conflict arbitration.

In another embodiment of the invention, a multiprocessor computer data processing system can be provided. The system can include multiple different processors coupled to memory in hardware and a transaction manager supported by an instruction set architecture (ISA) for each of the processors. The system also can include registers disposed in each of the processors. The registers can store priority values for transactions accessing memory managed by the transaction manager. Conflict arbitration logic also can be disposed in the system. The logic can include hardware or software enabled to apply conflict arbitration to conflicting ones of the transactions according to the priority values corresponding to the conflicting ones of the transactions. Finally, the system can include software support coupled to the hardware and configured to access the registers to set the priority values.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for software prioritization of concurrent transactions for embedded conflict arbitration in transactional memory management. In accordance with an embodiment of the present invention, a multiprocessor computing system can be configured for transactional memory management. Each processor in the system can include externally accessible registers storing priority values for corresponding transactions executed by the processor. Conflict arbitration logic is provided in the transactional memory system and arbitrates conflicted transactions according to externally established priority values stored in the registers corresponding to the conflicted transactions as directed by program code external to the processor. In this way, the conflict arbitration logic of the system can arbitrate conflicts for conflicted transactions without regard to the algorithm establishing the priority values.

Figure 1:
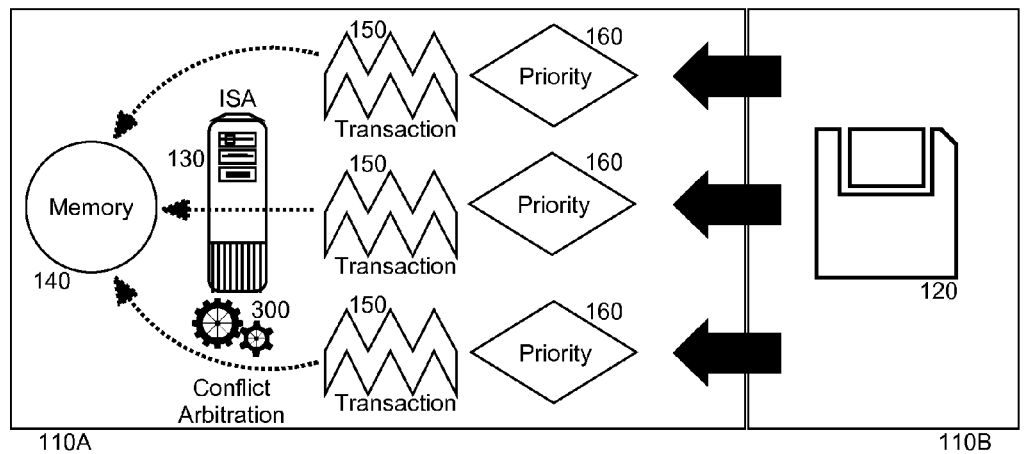
FIG. 1 is a pictorial illustration of a process for software prioritization of concurrent transactions for embedded conflict arbitration in transactional memory management.

In further illustration, FIG. 1 is a pictorial illustration of a process for software prioritization of concurrent transactions for embedded conflict arbitration in transactional memory management. As shown in FIG. 1, multiprocessor hardware 110A can combine with software support 110B such as a multiprocessor configured operating system to provide a multiprocessor computing system. The multiprocessor hardware 110A can implement an ISA and semantics 130 configured for transactional memory 140 across multiple different processors. In this regard, different processors can perform read and write transactions 150 on the transactional memory 140.

Notably, a priority 160 can be associated with each of the transactions 150. However, the priority 160 while stored in the multiprocessor hardware 110A, for example in internal registers, can be accessed and set by external priority assignment logic 120 provided by software support 110B. Optionally, the external priority assignment logic 120 when granted only non-privileged access to the internal registers storing the priority 160 can be limited to assigning a priority within a range of priority values. However, when granted privileged access to the internal registers storing the priority 160, the external priority assignment logic 120 can assign priority values above or below the default range of values.

The priority 160 can be dependent upon how long a transaction has been running and can be a function of the time accounting for when the transaction first started, with an earlier start time being assigned a higher priority value. In this regard, in response to an abort and restart condition, the original start time of the transaction can be reused to set the priority so that the assigned priority is the same as when the transaction was first attempted. Such a timestamp-based approach can be desirable to avoid repeating work when older transactions are aborted and restarted. Further, priorities based upon a timestamp of when a transaction first started promotes fairness in that over time as a transaction ages it has a higher likelihood of winning in a conflict.

The priority 160 also can be contingent on how much data a transaction has accessed or how much computation the transaction has performed. As a transaction progresses the priority may be increased at various points, reflecting the increased progress. As in the timestamp approach, the priority can be used as a measure of how much work would be repeated if a transaction were to be aborted and restarted. As yet another alternative, the priority can depend upon whether the transaction has been blocked or aborted and restarted. Specifically on a block/abort or in the face of repeated blocks/aborts, the priority 160 can be increased in order to promote fairness and forward progress of the transaction.

In any event, once established, though, each priority 160 can be evaluated in conflict arbitration performed by a conflict arbitration process 300 for the transactional memory 140 as defined within the implementation of the ISA and semantics 130 in the multiprocessor hardware 110A. In this way, the mechanism by which conflicts in the transactional memory 140 are arbitrated can remain separate from the algorithm by which the priorities 160 are established for each of the transactions 150. Further, though the priorities 160 can be established differently through changes in the external priority assignment logic 120 provided by software support 110B, the conflict arbitration process 300 can remain unaffected.

Figure 2:
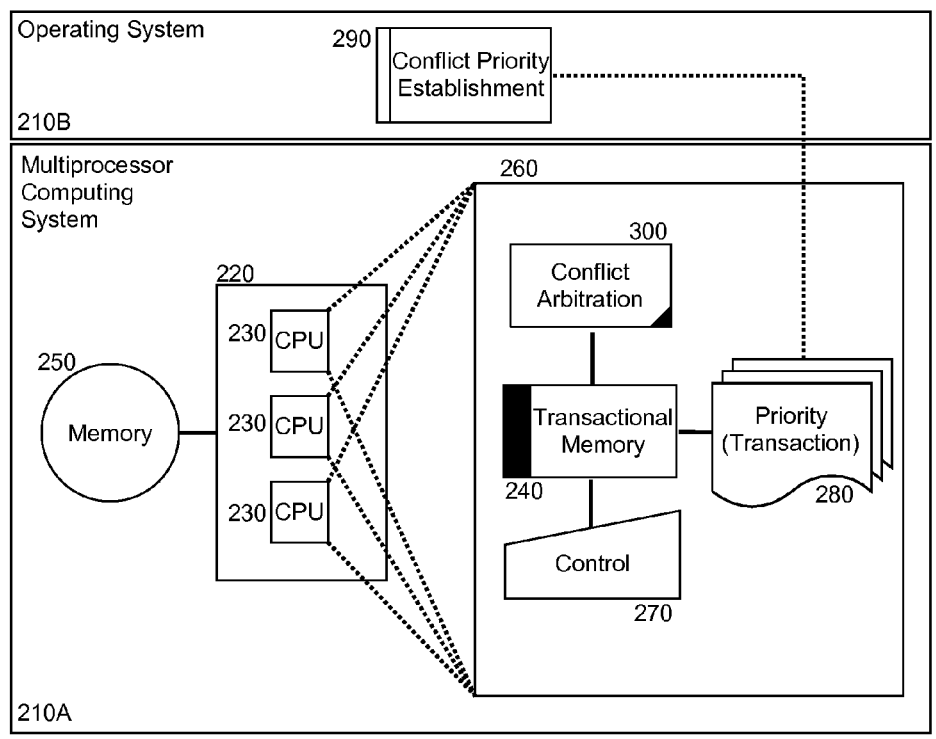
FIG. 2 is a schematic illustration of a multiprocessor computing system configured for software prioritization of concurrent transactions for embedded conflict arbitration in transactional memory management; and, FIG. 3 is a flow chart illustrating a process for software prioritization of concurrent transactions for embedded conflict arbitration in transactional memory management.

The process described in FIG. 1 can be implemented within an ISA and semantics for a multiprocessor computing system. In illustration, FIG. 2 is a schematic illustration of a multiprocessor computing system configured for software prioritization of concurrent transactions for embedded conflict arbitration in transactional memory management. The system can be a multiprocessor computing system 210A including multiple different processors 230 in a multiprocessor arrangement 220, each coupled to common memory 250. Further, the multiprocessor computing system 210A can support the operation of an operating system 210B executing on top of the multiprocessor computing system 210A.

Each of the processors 230 can provide an ISA and semantics supporting a transactional memory manager 240 managing read and write sets of transactions to memory 250. In that conflicts can arise in respect to the concurrent writing or reading or transactions to a same block of the memory 250, conflict arbitration logic 300 can be coupled to the transactional memory manager 240. In particular, the conflict arbitration logic 300 is enabled to arbitrate a set of transactions attempting to access a same block of the memory 250 according to the priorities 280 associated with the set of transactions.

Specifically, different registers within each processor 230 can be allocated for storing priorities 280 corresponding to different transactions pending to be committed to memory 250. Conflict priority establishment logic 290 can be disposed within the operating system 210B and can enjoy access to the priorities 280 as can other application code in order to establish individual ones of the priorities 280. The conflict arbitration logic 300, in turn, can be enabled in response to detecting a conflict for a set of transactions to retrieve corresponding ones of the priorities 280 and to apply conflict arbitration based upon the retrieved corresponding ones of the priorities 280 in order to resolve the detected conflict. Options include aborting lower priority transactions, or forcing a wait on individual ones of the transactions lacking a requisite priority.

An additional register or registers within each processor 230 can be allocated to store a conflict arbitration control value 270. The conflict arbitration control value 270 can specify the type and nature of actions to be performed when arbitrating a conflict amongst a set of conflicted transactions pending to be committed to memory 250 according to the respective priorities 280. For example, the conflict arbitration control value 270 can specify the disabling of transaction blocking thereby forcing a complete abort for each transaction of lower priority than the highest priority transaction in conflict. In contrast, the conflict arbitration control value 270 can permit blocking of conflicted transactions in order to avoid the forcing of an abort for each transaction of lower priority than the highest priority transaction in conflict. As yet another alternative, the conflict arbitration control value 270 can specify the permitting of hardware blocking of a conflicted transaction of lower priority, or the conflict arbitration control value 270 can specify the requirement that blocking is performed in software triggered by a hardware generated interrupt.

Notably, the conflict arbitration control value 270 can specify a duration of blocking for a transaction when blocking is permitted, in terms of time (e.g. milliseconds) or machine cycles. Also, the conflict arbitration control value 270 can enable adaptive hardware backoff so that when specified, the adaptive hardware backoff can require a lengthening of the duration as conflicts repeatedly occur with respect to a transaction. Even yet further, the conflict arbitration control value 270 can provide a limitation on how often a transaction can be blocked in conflict rather than aborted. Once a threshold limitation of repeated conflicts within a specified period of time has been detected for a transaction, when specified by the conflict arbitration control value 270, the transaction can be forced to abort upon a next occurring conflict. Alternatively, once the threshold limitation has been reached, an interrupt can be generated to trigger software arbitration of the conflict. Finally, the conflict arbitration control value 270 can specify the generation of an interrupt for software arbitration of a conflict amongst two or more transactions with equal corresponding ones of the priorities 280.

Figure 3:
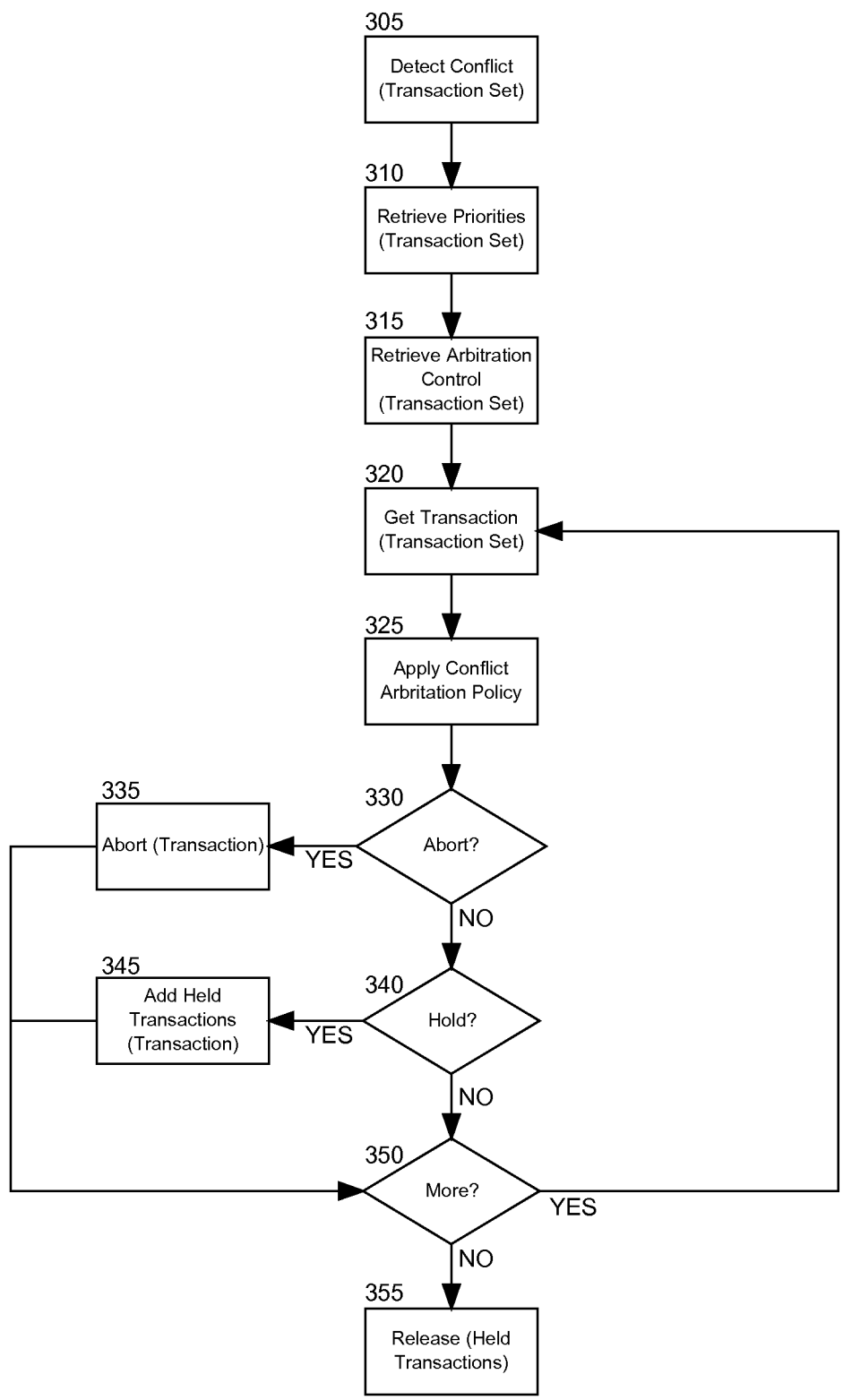

In further illustration of the conflict arbitration logic 300, FIG. 3 is a flow chart illustrating a process for software prioritization of concurrent transactions for embedded conflict arbitration in transactional memory management. Beginning in block 305, a conflict can be detected in connection with a block of memory and a set of transactions. In block 310, the priorities for each of the transactions in the set can be retrieved and in block 315, a conflict arbitration control parameter can be retrieved to determine the type and nature of actions that can be taken when arbitrating a conflict according to the priorities of the involved transactions. Thereafter, in block 320 a transaction can be selected amongst the set of transactions.

In block 325, the retrieved conflict arbitration control policy can be applied to the transaction in respect to the priority for the selected transaction. Also, in decision block 330, if it is determined to abort the selected transaction, in block 335 the selected transaction can be aborted. Otherwise, in block 340, if it is determined to block the selected transaction, in block 345 the selected transaction can be blocked for some time period of time associated with a conflict arbitration control value. In either circumstance, in decision block 350, if additional transactions remain to be processed in the transaction set, the process can return to block 320 with the selection of a next transaction in the transaction set.

Embodiments of the invention can take the form of an entirely hardware embodiment, an entirely software embodiment or an embodiment containing both hardware and software elements. In a preferred embodiment, the invention is implemented in any of firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for software prioritization of concurrent transactions for embedded conflict arbitration in transactional memory management, the method comprising:
    setting different processor registers with different priority values for correspondingly different transactions in a transactional memory system configured for transactional memory management according to respective priority values specified by priority assignment logic in external software support for the system;
    detecting a conflict amongst the transactions in the system; and,
    applying conflict arbitration within the system based upon the priority values specified by the priority assignment logic in the external software support for the system by blocking a selected one of the transactions having a lower priority than others of the transactions for a duration of time that increases each time the selected one of the transactions is detected to conflict with the others of the transactions.

2. The method of claim 1, further comprising:
    retrieving a conflict arbitration control value from another register in the system, the conflict arbitration control value specifying at least one of type and a nature of a conflict arbitration action; and,
    limiting the applying of the conflict arbitration to at least one of a type and a nature of a conflict arbitration action specified by the conflict arbitration control value.

3. The method of claim 1, further comprising limiting the different priority values to a range of priority values able to be specified by the priority assignment logic in the external software support for the system.

4. The method of claim 1, wherein applying conflict arbitration within the system based upon the priority values specified by the priority assignment logic in the external software support for the system, comprises aborting a selected one of the transactions having a lower priority than others of the transactions.

5. The method of claim 1, wherein applying conflict arbitration within the system based upon the priority values specified by the priority assignment logic in the external software support for the system, comprises:
    detecting at least two of the transactions with equal priorities; and,
    generating an interrupt to the external software support to perform conflict arbitration for the at least two of the transactions in lieu of the processor performing the conflict arbitration.

6. The method of claim 1, wherein blocking a selected one of the transactions having a lower priority than others of the transactions,
    wherein the blocking of a selected one of the transactions having a lower priority than others of the transactions for a duration of time that increases each time the selected one of the transactions is detected to conflict with the others of the transactions, occurs until a threshold number of conflicts are detected; and,
    upon exceeding the threshold number of conflicts for the selected one of the transactions, forcing an abort of the selected one of the transactions.

7. A multiprocessor computer data processing system comprising:
    a plurality of processors coupled to memory in hardware;
    a transaction manager implemented in an instruction set architecture (ISA) and semantics for each of the processors;
    processor registers disposed in each of the processors, the registers storing priority values for transactions accessing memory managed by the transaction manager;
    conflict arbitration logic disposed in the system, the logic enabled to apply conflict arbitration to conflicting ones of the transactions according to the priority values corresponding to the conflicting ones of the transactions by blocking a selected one of the transactions having a lower priority than others of the transactions for a duration of time that increases each time the selected one of the transactions is detected to conflict with the others of the transactions; and,
    software support coupled to the hardware and configured to access the registers to set the priority values.

8. The system of claim 7, further comprising a register in each of the processors specifying a conflict arbitration control value, the conflict arbitration control value specifying one of a type and nature of conflict arbitration actions able to be performed for conflicting ones of the transactions.

9. A computer program product comprising a computer usable storage memory device storing computer usable program code for software prioritization of concurrent transactions for embedded conflict arbitration in transactional memory management, the computer program product comprising:
    computer usable program code for setting different processor registers with different priority values for correspondingly different transactions in a system configured for transactional memory management according to respective priority values specified by priority assignment logic in external software support for the system;
    computer usable program code for detecting a conflict amongst the transactions in the system; and,
    computer usable program code for applying conflict arbitration within the processor based upon the priority values specified by the priority assignment logic in the external software support for the system by blocking a selected one of the transactions having a lower priority than others of the transactions for a duration of time that increases each time the selected one of the transactions is detected to conflict with the others of the transactions.

10. The computer program product of claim 9, further comprising:
    computer usable program code for retrieving a conflict arbitration control value from another register in the processor, the conflict arbitration control value specifying at least one of type and a nature of a conflict arbitration action; and,
    computer usable program code for limiting the applying of the conflict arbitration to at least one of a type and a nature of a conflict arbitration action specified by the conflict arbitration control value.

11. The computer program product of claim 9, further comprising computer usable program code for limiting the different priority values to a range of priority values able to be specified by the priority assignment logic in the external software support for the system.

12. The computer program product of claim 9, wherein the computer usable program code for applying conflict arbitration within the system based upon the priority values specified by the priority assignment logic in the external software support for the system, comprises computer usable program code for aborting a selected one of the transactions having a lower priority than others of the transactions.

13. The computer program product of claim 9, wherein the computer usable program code for applying conflict arbitration within the system based upon the priority values specified by the priority assignment logic in the external software support for the system, comprises:
- computer usable program code for detecting at least two of the transactions with equal priorities; and,
- computer usable program code for generating an interrupt to the external software support to perform conflict arbitration for the at least two of the transactions in lieu of the system performing the conflict arbitration.

14. The computer program product of claim 9, wherein the computer usable program code for blocking a selected one of the transactions having a lower priority than others of the transactions, comprises:
- wherein the blocking of a selected one of the transactions having a lower priority than others of the transactions for a duration of time that increases each time the selected one of the transactions is detected to conflict with the others of the transactions, occurs until a threshold number of conflicts are detected; and,
- an abort of the selected one of the transactions is forced upon exceeding the threshold number of conflicts for the selected one of the transactions.

* * * * *